US010076931B2

(12) United States Patent
Finkbeiner

(10) Patent No.: US 10,076,931 B2
(45) Date of Patent: Sep. 18, 2018

(54) LIFTING DEVICE AND METHOD FOR INSTALLING AND UNINSTALLING A WHEEL USING SUCH A LIFTING DEVICE

(71) Applicant: Gerhard Finkbeiner, Freudenstadt (DE)

(72) Inventor: Gerhard Finkbeiner, Freudenstadt (DE)

(73) Assignee: Gerhard Finkbeiner, Freudenstadt (DE)

( * ) Notice: Subject to any disclaimer, the term of this patent is extended or adjusted under 35 U.S.C. 154(b) by 812 days.

(21) Appl. No.: 14/413,044

(22) PCT Filed: Jun. 6, 2013

(86) PCT No.: PCT/EP2013/061714
§ 371 (c)(1),
(2) Date: Jan. 6, 2015

(87) PCT Pub. No.: WO2014/005790
PCT Pub. Date: Jan. 9, 2014

(65) Prior Publication Data
US 2015/0202921 A1    Jul. 23, 2015

(30) Foreign Application Priority Data
Jul. 6, 2012    (DE) .......................... 10 2012 106 073

(51) Int. Cl.
*B60B 29/00*   (2006.01)
*B60B 30/02*   (2006.01)
(Continued)

(52) U.S. Cl.
CPC ............ *B60B 29/001* (2013.01); *B60B 30/02* (2013.01); *B66F 5/00* (2013.01); *B66F 7/04* (2013.01);
(Continued)

(58) Field of Classification Search
CPC ............ B60B 29/001; B60B 2900/112; B60B 2900/113; B60B 2900/115;
(Continued)

(56) References Cited

U.S. PATENT DOCUMENTS 2,640,615 A    6/1953   Wedel
4,825,977 A    5/1989   Isogai
(Continued)

FOREIGN PATENT DOCUMENTS

AU    2008 101 096 A4   12/2008
CN    2885817    * 11/2005   ................ B66F 9/06
(Continued)

OTHER PUBLICATIONS

Kong et al. CN 2885817 EPO English Machine Translation, High Tire Dismantling Machine, Sep. 11, 2017, pp. 1-3.*
(Continued)

*Primary Examiner* — Bayan Salone
(74) *Attorney, Agent, or Firm* — Renner, Otto, Boisselle & Sklar, LLP

(57) ABSTRACT

The invention relates to a lifting device for lifting loads, vehicles, or the like, comprising a mobile base frame (12); a lifting column (14) provided on the base frame (12); a support (15), said lifting column (14) and support (15) being guided by a guide (45); a load receiving means (20) which is arranged on the support (15) and by means of which a load receiving region (21) is determined, said base frame (12) having at least three support points outside of the load receiving region (21) of the load receiving means (20); and a drive unit which can be controlled by a controller and which moves the support (14) up and down relative to the lifting column (14). The lifting column (14) is arranged on the base frame (12) eccentrically to the load receiving region
(Continued)

Figure 1:
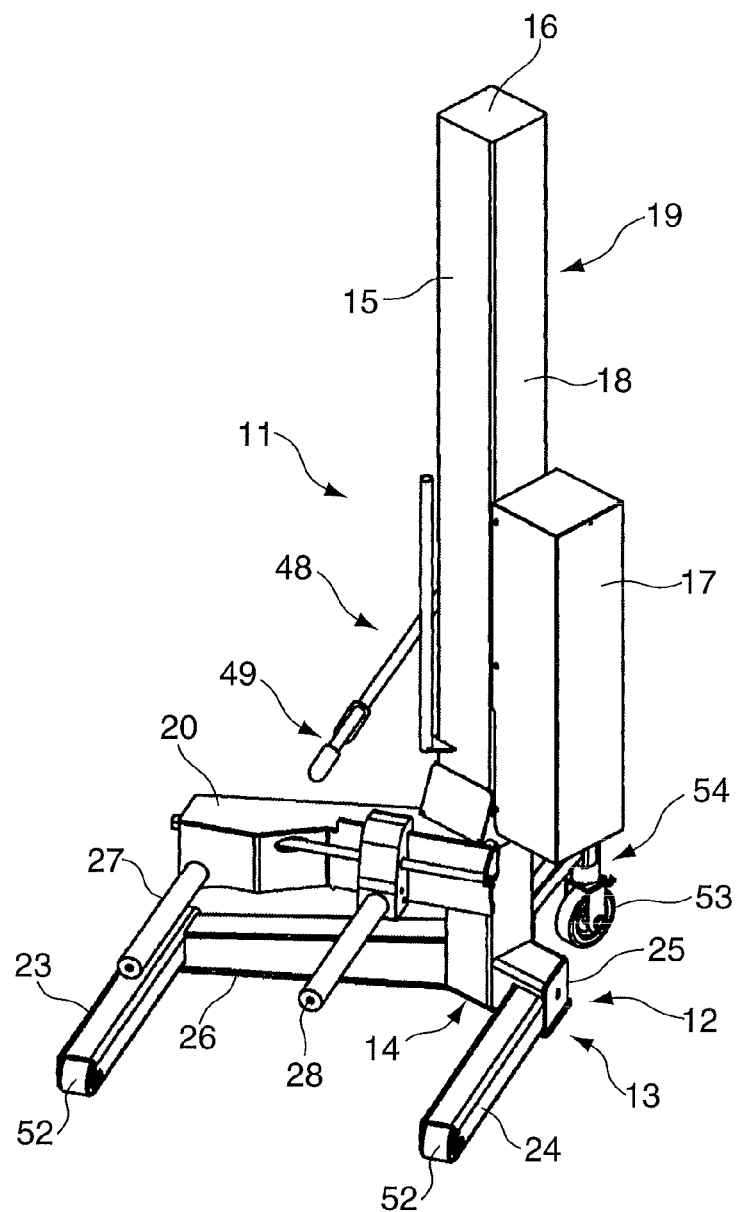

(21) and in a rotated manner relative to a longitudinal side of the load receiving region (20).

13 Claims, 8 Drawing Sheets

(51) Int. Cl.
*B66F 7/04* (2006.01)
*B66F 5/00* (2006.01)

(52) U.S. Cl.
CPC ....... *B60B 2340/30* (2013.01); *B60B 2340/70* (2013.01); *B60B 2900/112* (2013.01); *B60B 2900/113* (2013.01); *B60B 2900/115* (2013.01); *B60B 2900/531* (2013.01); *B60B 2900/541* (2013.01); *Y10T 29/4973* (2015.01); *Y10T 29/49718* (2015.01); *Y10T 29/49721* (2015.01); *Y10T 29/49817* (2015.01)

(58) Field of Classification Search
CPC ........ B60B 2900/531; B60B 2900/541; B60B 30/02; B60B 3240/30; B60B 2340/70; B66F 7/04; B66F 5/00; Y10T 29/49817; Y10T 29/49718; Y10T 29/49721; Y10T 29/4973
USPC ................................ 29/402.1, 402.3, 402.08
See application file for complete search history.

(56) References Cited

U.S. PATENT DOCUMENTS

| | | | | |
|---|---|---|---|---|
| 5,127,638 | A * | 7/1992 | Kent | .......................... B62B 3/04 254/133 R |
| 5,484,134 | A * | 1/1996 | Francis | ..................... B66F 7/04 254/2 B |
| 6,814,342 | B1 | 11/2004 | Perlstein et al. | |
| 8,100,626 | B2 * | 1/2012 | Shai | .......................... B66F 3/46 414/607 |
| 8,162,107 | B2 * | 4/2012 | Finkbeiner | ................ B66F 7/28 187/237 |
| 9,193,572 | B2 * | 11/2015 | Finkbeiner | ................ B66F 3/44 |
| 9,580,284 | B2 * | 2/2017 | Helmich | ................... B66F 3/46 |
| 2004/0022611 | A1 * | 2/2004 | Finkbeiner | ................ B66F 3/46 414/458 |
| 2007/0214686 | A1 | 9/2007 | Shai | |
| 2008/0060880 | A1 | 3/2008 | Finkbeiner | |

FOREIGN PATENT DOCUMENTS

| | | | |
|---|---|---|---|
| CN | 2885817 | * | 11/2006 |
| CN | 2 885 817 | Y | 4/2007 |
| DE | 26 59 710 | A1 | 7/1978 |
| DE | 691 07 560 | T2 | 8/1991 |
| DE | 693 11 949 | T2 | 4/1993 |
| DE | 201 11 425 | U1 | 7/2001 |
| DE | 10 2006 014 799 | A1 | 10/2007 |
| DE | 20 2007 014662 | U1 | 12/2007 |
| DE | 20 2006 013854 | U1 | 1/2008 |
| EP | 0 478 035 | B1 | 8/1991 |
| EP | 0 566 203 | B1 | 4/1993 |
| EP | 0 571 917 | A2 | 12/1993 |
| FR | 2 781 779 | A1 | 2/2000 |
| JP | 2000 247590 | A | 9/2000 |
| WO | 95/25062 | A1 | 9/1995 |

OTHER PUBLICATIONS

CN 2885817, Kong et al.; High Tire Dismantling Machine; Sep. 8, 2017; EPO Machine Translation; pp. 1-3.*
International Search Report and Written Opinion for corresponding patent application No. PCT/EP2013/061714 dated Aug. 21, 2013.

* cited by examiner

LIFTING DEVICE AND METHOD FOR INSTALLING AND UNINSTALLING A WHEEL USING SUCH A LIFTING DEVICE

The invention relates to a mobile lifting device for lifting loads, vehicles or similar, as well as a method for installing and uninstalling a wheel having such a lifting device.

A mobile lifting device is known from WO 2010/112200 A1 which is also referred to as a single-column platform. Such a lifting device comprises a mobile base frame having a lifting column arranged thereon, in which a support having a load receiving means arranged thereon is guided to be able to move back and forth. For lifting and lowering, a lifting unit is provided which comprises at least one control and one hydraulic cylinder, in order to move the load receiving means back and forth. To ensure the stability in mobile use, the base frame has three support points outside the load receiving region.

Such an arrangement has been proved to be expedient in use. However, a wheel replacement is made more difficult for a vehicle that is lifted by means of the device as the vehicle wheels, in particular the wheel nuts, are not accessible or are only accessible with difficulty. Additionally, maintenance work on the braking system is not able to be undertaken in the lifted state, since the fixing points of the vehicle brakes are also covered by the lifting column guide. For work on the vehicle wheels or brakes, additional work processes are therefore required which require the use of a wheel mounting trolley or wheel lift truck. Such devices are therein typically driven by means of a hand crank or hydraulic hand pump and not using a motor and require a correspondingly intensive exertion of force by the workshop personnel. In order to enable direct access to the wheel nuts, the lifting column of such wheel mounting trolleys can be arranged to be laterally offset. These wheel mounting trolleys can be used exclusively for wheel replacement.

The object of the invention is to create a mobile lifting device having high rigidity as well as to propose a method for installing and uninstalling wheels, whereby both work on a body or a drive train and for installing and uninstalling wheels or work on the braking system of a vehicle is enabled and thus the total number of the required work steps is reduced as well as the requirement to use additional tools.

This object is solved according to the invention by a lifting device in which the lifting column is arranged eccentrically with respect to the load receiving region on the base frame and opposite a longitudinal side of the load receiving region in a rotated manner. Due to this arrangement and design of the lifting device, this can enable a dual function. On the one hand, the lifting device serves as a mobile single-column lifting platform which is able to be used with further single-column lifting platforms to lift and lower complete vehicles and, on the other hand, enables a simple wheel installation, whereby the additional acquisition of a wheel mounting trolley as well as the use of the wheel mounting trolley is able to be dispensed with. Due to this asymmetrical lifting column, the wheels nuts as well as the fixing points on the wheel hub are freely accessible. In this way, a wheel installation or wheel uninstallation is able to be implemented without the additional use of a wheel mounting trolley and the additional work steps connected to this. At the same time, the required time expenditure for the additional driving up and tidying away of the wheel mounting trolley and the required exertion of force by the workshop personnel for the manual drive of such a wheel mounting trolley is thus dispensed with.

A preferred embodiment of the lifting platform provides that a resulting force is formed by the lifting column and the support during load reception of the lifting device, said resulting force acting perpendicularly to the guide of the lifting column and of the support as well as pointing in the direction of the load receiving region and lying within this. Thus, a particularly high level of rigidity of the lifting device can be achieved, wherein the advantages of the asymmetrical arrangement are maintained.

Advantageously, a resulting force F is formed by the lifting column and the support during load reception, which acts perpendicularly to at least one guide surface or at least one guide element of the guide of the lifting column and of the support, wherein the resulting force F preferably points in the direction of the orientation direction of the maximum load reception capacity of the lifting column. A compact lifting device having a high load reception capacity can be formed by this arrangement.

A preferred embodiment of the base frame provides that this has at least one first arm having a first support point and a second arm having a second support point, wherein the first arm and the second arm are aligned substantially in parallel and are connected to at least one arm in a substantially U-shaped manner. The support points are preferably formed by rollers. Due to this geometric design of the base frame, the anti-tilt stability of the lifting device required to lift large loads is ensured.

As a further embodiment of the base frame, the U-shaped connection can occur by a straight-line arm, such that the three arms are arranged at right angles to one another. The lifting column itself can be arranged to be twisted onto the connection arm and to be asymmetrical. Alternatively, the third arm can represent a connection between the first and second arm, wherein these two are each arranged at an obtuse angle to the third arm. A further alternative embodiment can provide that the first and second arm are aligned in parallel, yet are of different lengths, such that the third arm forms a connection between the shorter and the longer arm, whereby the third arm is fixed, on the one hand, at an acute angle to the longer, and on the other hand at an obtuse angle to the shorter arm. The lifting column can in turn be arranged on the third arm to be rotated eccentrically.

According to an advantageous development of the invention, the substantially U-shaped connection of the two parallel arms of the base frame is formed by at least two arms of different lengths, which are arranged at an obtuse angle to each other and preferably at least the third and fourth arms are arranged at an obtuse angle to the first and second arms. Thus, the third and fourth arms are each arranged at an angle to a load receiving region determined by the load receiving means, such that a lifting column which is positioned eccentrically to the base frame on the third or fourth arm has an alignment of the resulting force which points into the load receiving region or crosses this. The load receiving region preferably extends as a rectangular or square surface between the parallel arms of the base frame or within the load receiving means.

Preferably, the lifting column is arranged on the shorter arm. In this way, the positioning of the lifting column and of the support that is offset and twisted according to the invention is achieved by a comparably simple, constructive construction and a third support point is formed outside the load receiving region, directly on the lifting column, preferably on the shorter arm.

Furthermore, the lifting column is preferably arranged on the shorter arm and is positioned adjacent to the longer lifting arm. Thus, on the one hand, an eccentric arrangement of the lifting column is enabled, wherein, at the same time, an alignment of the lifting column with regard to the guide element thereof with the load receiving region occurs using the ratio of the arms of unequal length, as a guide element of the lifting column is preferably aligned in parallel to a wall section of the shorter arm pointing towards the load receiving region. Thus, a geometrically simple construction having a high level of rigidity can be achieved.

According to a preferred embodiment of the invention, the load receiving means is formed as a wheel gripping element having a first and second fork arm, which are aligned in parallel to the first and second arm. Thus, the lifting device can engage with a tyre of the same to lift a vehicle. A retaining section is formed between the fork arms and the support, which compensates for the angular arrangement of the support or of the lifting column, such that the fork arms are aligned in parallel to the arms. Thus, the load receiving means is in turn able to be lowered completely between the base frame, despite a twisted arrangement of the lifting column with respect to the load receiving region, in order to maintain this very simple handling. This is, in particular, of advantage during the installation of the wheel on the wheel hub, such that the hole spacing of the wheel rim can be aligned congruently with that of the wheel hub by simple rotation of the wheel.

A further preferred embodiment of the invention provides that the load receiving means has roller-mounted or slidable receiving elements at least in sections on at least one of the two fork arms. Thus, a wheel standing on the load receiving means is able to rotate around its axis of rotation.

According to one advantageous embodiment, at least one fork arm is thereby embodied as a roller or drum, such that a wheel received by the load receiving means can be rotated.

According to a further embodiment, at least one of the fork arms is arranged to be displaced relative to the other fork arm, such that an adjustment of the load receiving means to different wheel sizes can take place. Due to an enlargement or reduction of the spacing of the fork arms, a wheel resting on the wheel gripping element can be precisely positioned laterally to the lifting device, without the load receiving means moving back and forth. In this way, the lifting device integrates functions which serve for its use for wheel installation. Alternatively, it can be provided that only one of the two fork arms is also able to be displaced and the other is arranged to be fixed. Thus, a precise adjustment can also occur.

According to a further preferred embodiment, a wheel retaining device is provided on the lifting column or on the base frame. This wheel retaining device is preferably able to be positioned above the load receiving such that, during use of the lifting device as a wheel mounting trolley, during a lifting and lowering movement and during a drive movement, a wheel located on the load receiving means can be supported securely it its standing position.

This wheel retaining device preferably has a U-shaped gripper section in order to engage with the tyre of the wheel. Thus, a release from and engagement with the wheel can be enabled by a simple twisting of the gripper section. In particular, the width of the gripper section as well as the position can be adjustable depending on the tyre size.

A further preferred embodiment of the invention provides that a steerable roller is allocated to the load receiving region opposite the lifting column and the support. Thus, on the one hand, anti-tilt stability is achieved. On the other hand, the handling of the lifting device remains similar to that which was obtained previously with lifting devices having a symmetrically aligned lifting column with respect to the base frame.

The object of the invention is furthermore solved by a method for installing and uninstalling the wheel using such a lifting device. The design of this lifting device enables that this can not only be used as part of a lifting system for undertaking maintenance and/or repair work of the vehicle, in which the uninstallation and a subsequent installation of the wheel is required, but rather that his lifting device at the same time also serves for the wheel installation or for the wheel replacement. Good accessibility to the wheel nuts of the wheel that is to be replaced is provided, in particular, due to the asymmetrical arrangement of the lifting column on the base frame. The additional acquisition of a wheel mounting trolley can be dispensed with due to this lifting device, as this lifting device makes use of both the function of a single-column lifting device and a wheel mounting trolley. Further storage space for such a wheel mounting trolley is not necessary.

It is preferably provided that a rotation of the wheel on the load receiving means takes place for the precise adjustment of the wheel for the installation on the wheel hub for the alignment of a hole pattern of the wheel rim to the hole pattern of the wheel hub and/or a displacement of the one fork arm relative to the further fork arm is implemented and/or a method for loading reception with regard to the height thereof occurs. Thus, the lifting device which is brought into position once can remain in this position, which is supported directly on the floor after the lifting of the load receiving, such that a quick wheel installation is enabled. Due to the rotating of the wheel and/or the displacement of a first or second fork arm and/or an additional lifting or lowering movement of the load receiving, the hole pattern of the wheel that is to be replaced is able to be positioned in all directions of the installing plane in order to achieve a covering of the hole pattern of the wheel rim to the hole pattern of the wheel hub.

The lifting device described above, in particular the single-column lifting platform, can not only be used as a component in a lifting system that is able to be configured from any number of lifting devices, but also individually as wheel mounting trolleys. Such wheel mounting trolleys are used for the installation and uninstallation of wheels in order to undertake, for example, repair work on the brakes of the body or similar. Likewise, such a wheel mounting trolley is used for wheel replacement.

Figure 2:
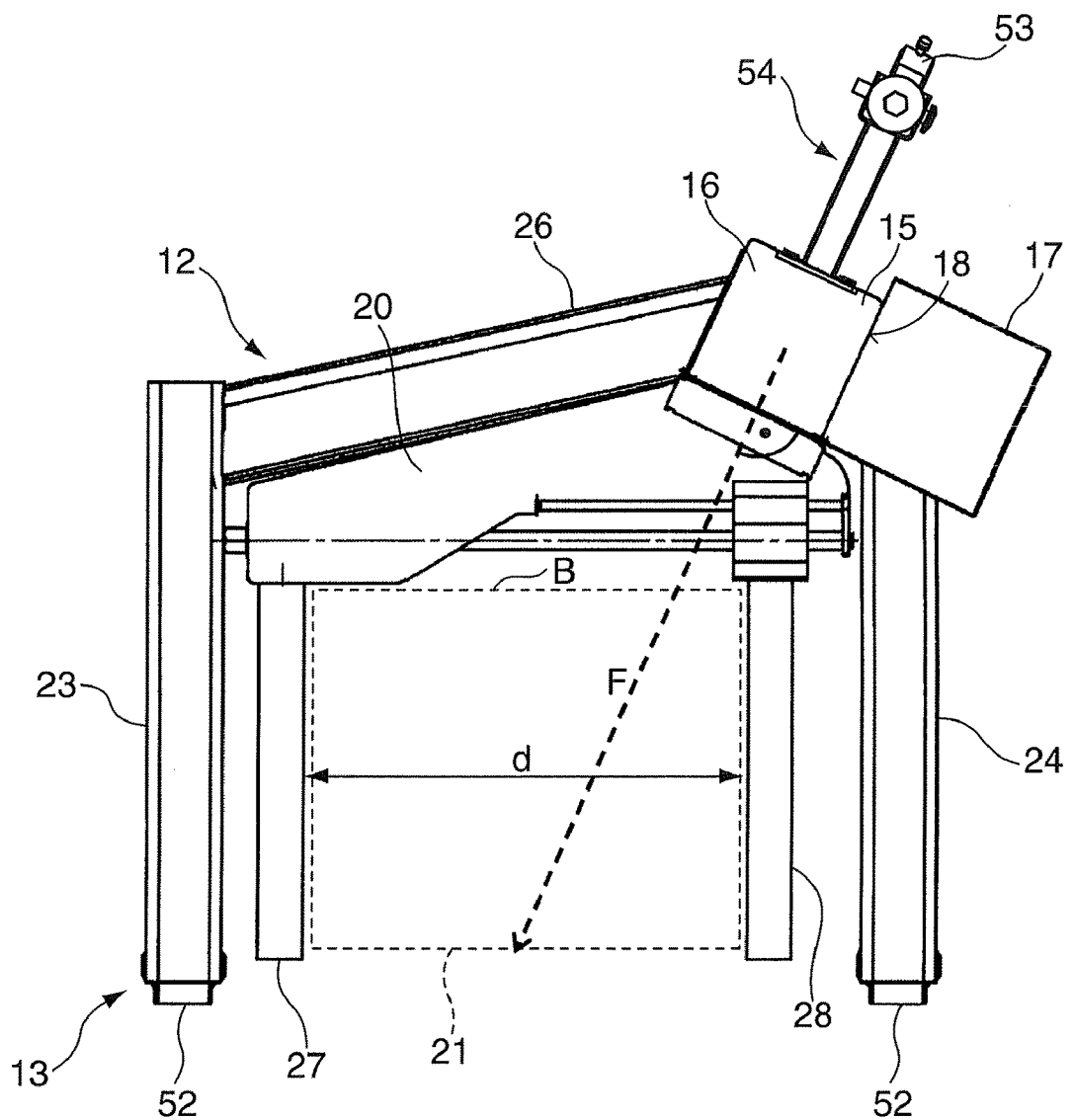
Figure 3A:
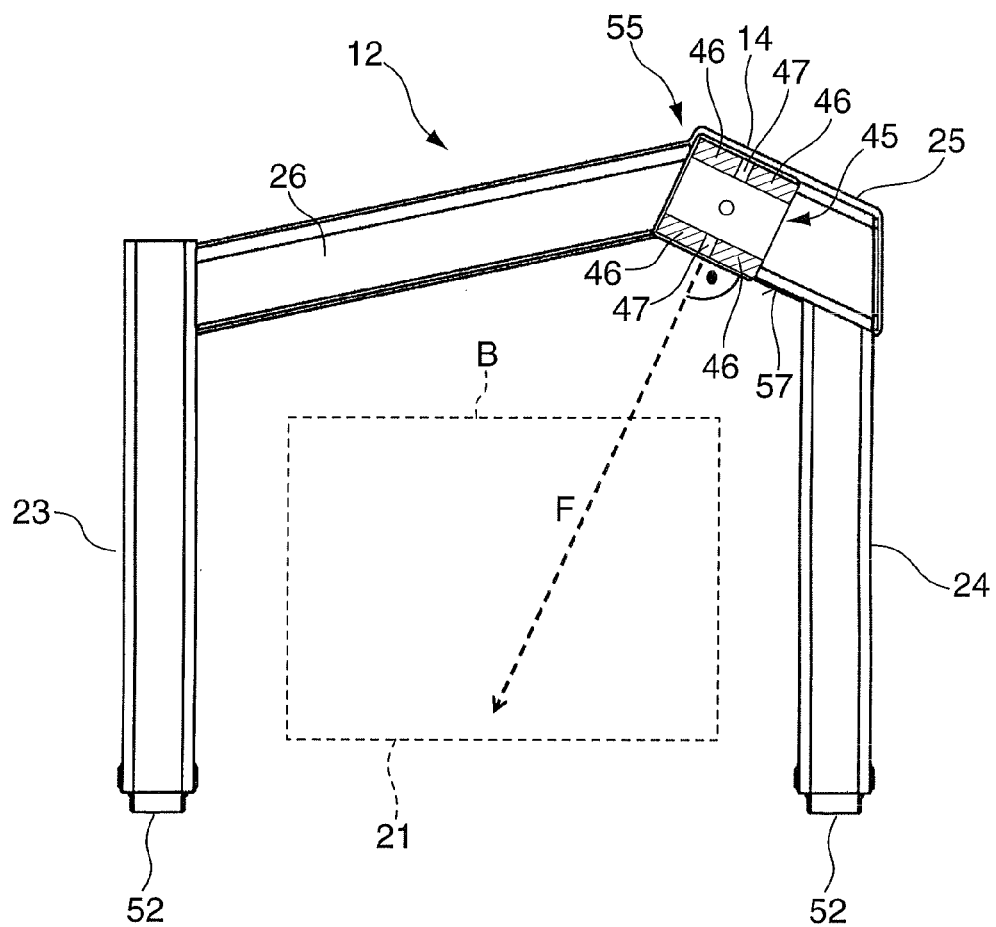

The invention as well as further advantageous embodiments and developments of the same are described and explained in more detail below by means of the examples depicted in the drawings. The features to be gleaned from the description and the drawings can be applied individually or with several together in any combination according to the invention. Here are shown:

FIG. 1 a perspective view of a lifting device according to the invention in a rest position, FIG. 2 a schematic view from above onto the embodiment according to FIG. 1, FIG. 3*a* a schematic view from above onto a base frame of the embodiment according to FIG. 1 with a sectional depiction of the lifting column, FIGS. 3*b* to 3*e* schematic views of alternative embodiments to FIG. 3*a,*

Figure 4:
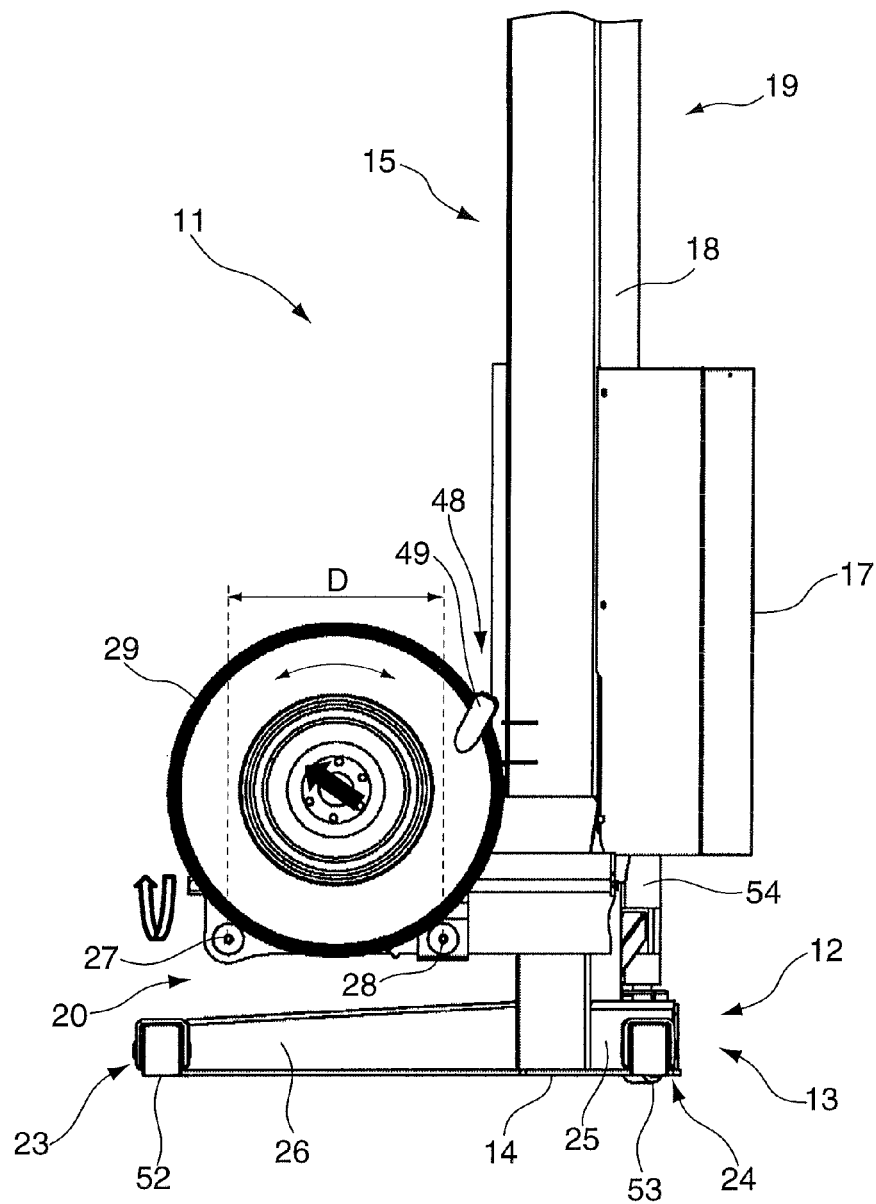
Figure 5:
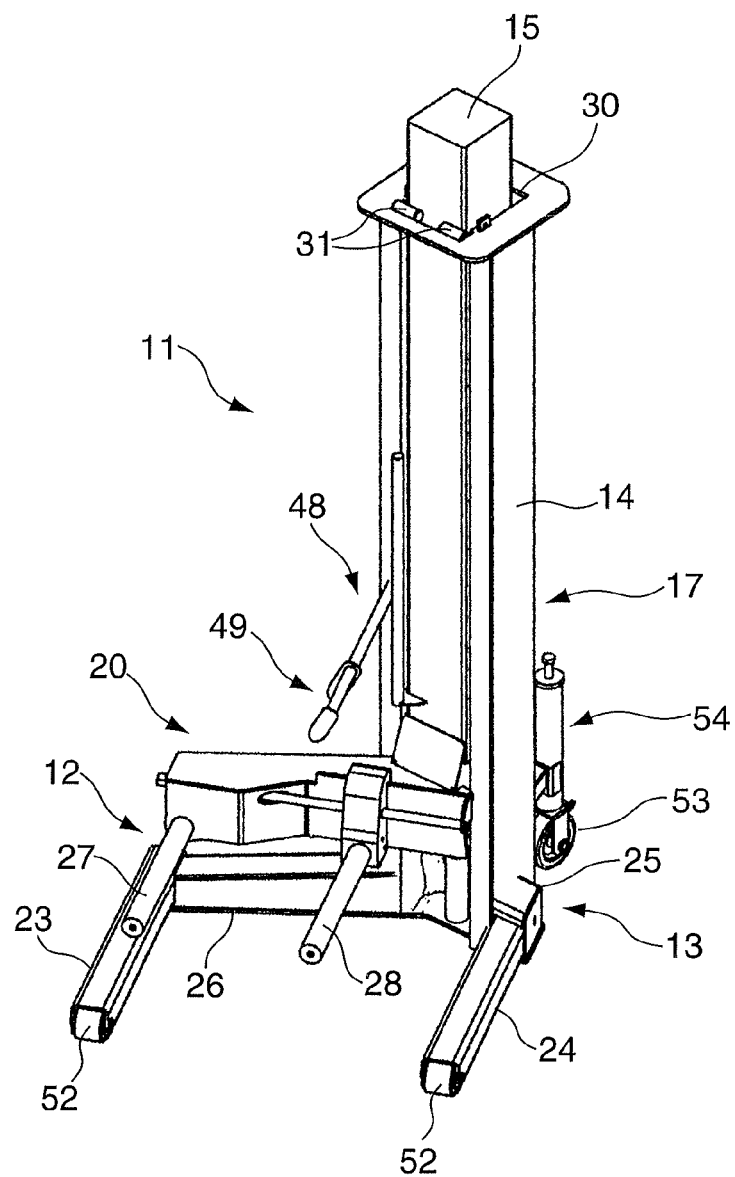
Figure 6:
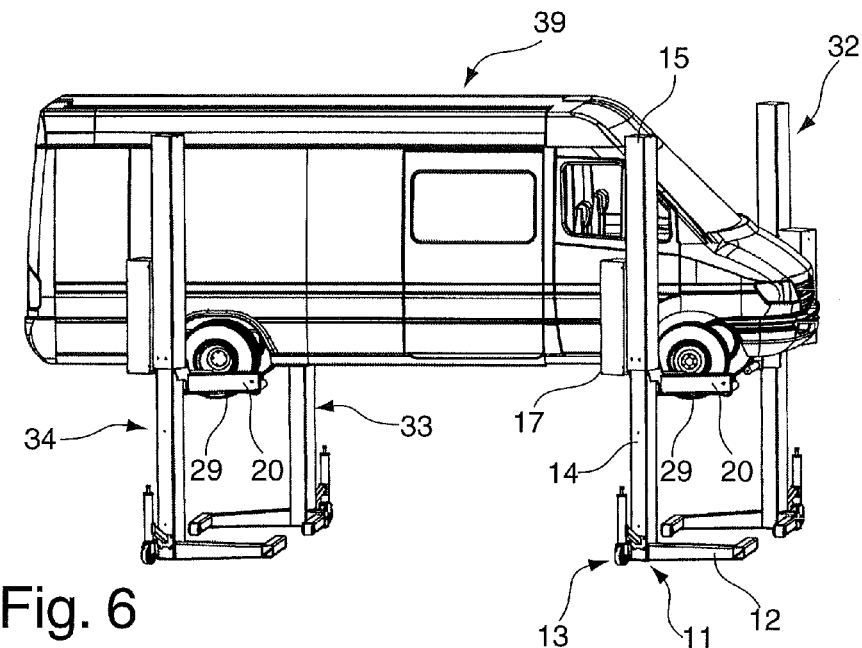
Figure 7:
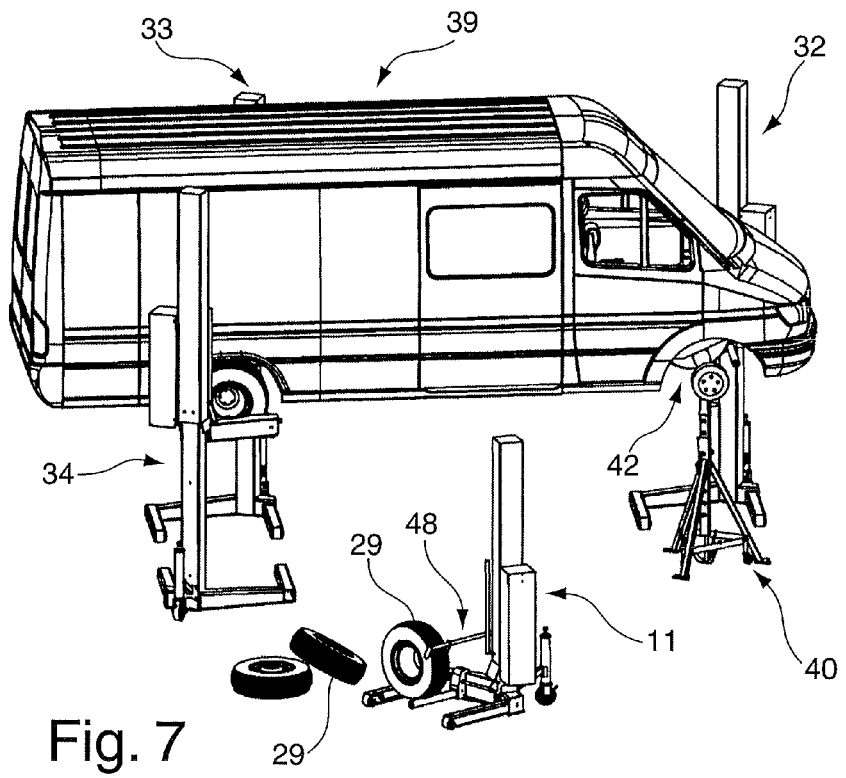
Figure 8:
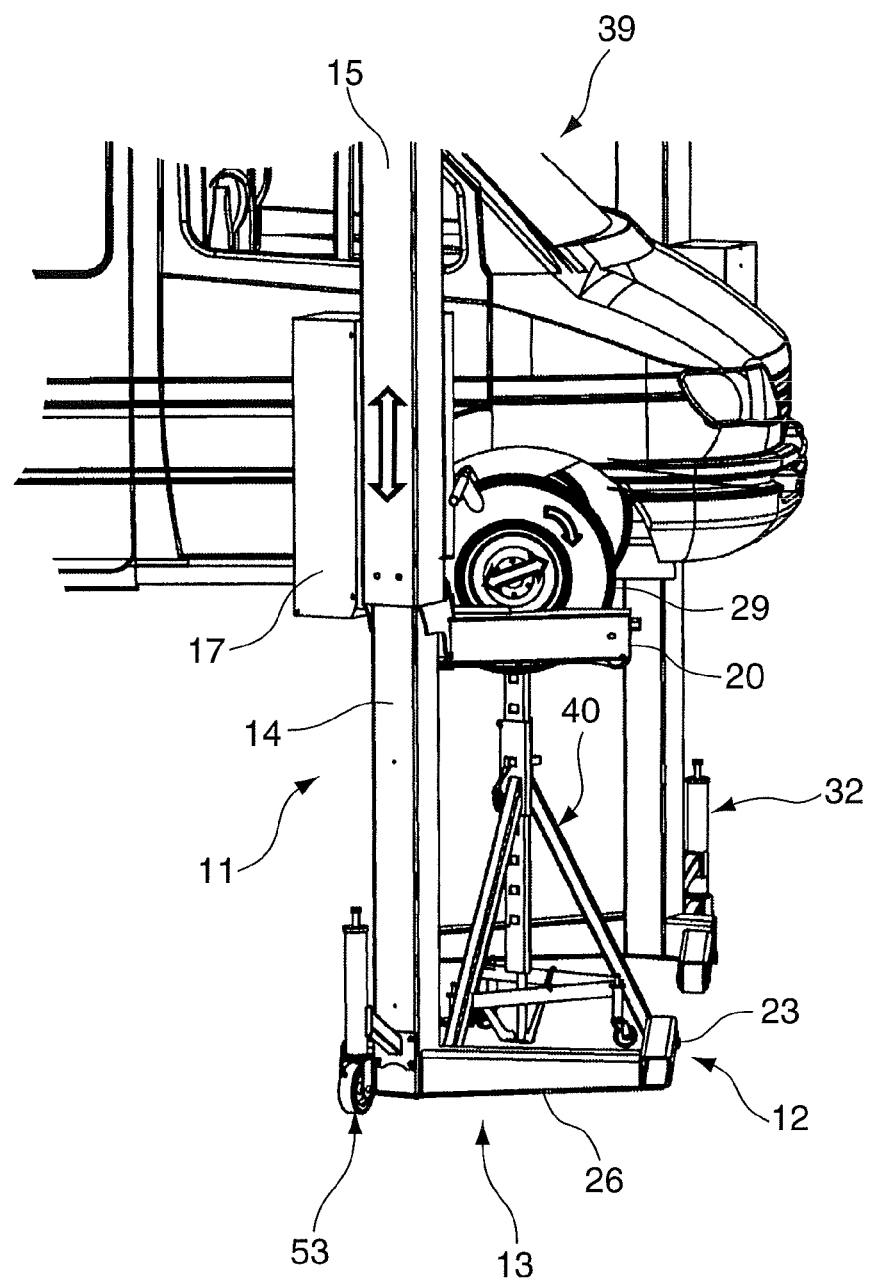

FIG. 4 an enlarged view of the side of the embodiment of FIG. 1 having a wheel received by the load receiving means, FIG. 5 a perspective view of an alternative embodiment to FIG. 1, FIG. 6 a perspective view of a four-column lifting mechanism having the lifting devices in an upper lifting end position, FIG. 7 a perspective view of the embodiment of FIG. 6 during the implementation of a wheel replacement and FIG. 8 an enlarged view of the lifting device according to FIG. 7 in an upper lifting end position during a precise adjustment of a wheel that is to be installed.

In FIG. 1, a perspective view of a lifting device 11 according to the invention is depicted, which is suitable for mobile use. FIG. 2 shows a schematic view of the lifting device 11 according to FIG. 1. Such lifting devices 11 are also referred to single-column lifting devices. The lifting device 11 has a mobile base frame 12, which preferably comprises a chassis or steering chassis 13. A lifting column 14 is provided on the base frame 12. A support 15 that is able to move back and forth is provided on the lifting column 14, said support 14 being formed, in this embodiment, as a square or rectangular tube or sleeve which is open on its lower front side, said tube or sleeve preferably substantially enclosing the lifting column 14 in the depicted rest position. This embodiment enables the geometry of the lifting column 14 to likewise be able to be formed as a pipe or sleeve-shaped profile or also as a closed profile, whereby a high level of rigidity of the lifting device 11 is provided. Thus, closed cross-sections can be created both for the lifting column 14 and for the support 15, which enable high force absorption. Furthermore, the closed embodiment of the support 15 having a cover 16 topping the support 15, has the advantage that all inner construction elements are not accessible from the outside and are protected from damp and/or dirt. The design of the profile of the lifting column 14 being within the support 15 is only by way of example. Such an embodiment is known from WO 2010/112200 A1, to which reference is made in its full scope.

A lifting unit 17 is preferably provided on the support 15, which comprises a control which is not depicted in more detail as well as a drive unit and, preferably, accumulators to drive the drive unit and the control. The drive unit comprises, in a hydraulic embodiment, a hydraulic installation and a lifting cylinder. In a mechanical embodiment of the drive unit, a spindle drive can be provided which comprises a spindle having an electric drive motor. Likewise, further electrical, electromechanical or electrohydraulic drives for a control of a lifting and lowering movement of the load receiving means can be provided. Due to the support of the lifting unit 17 on the support 15, the construction as well as the associated cabling and laying of potential hydraulic lines can be simplified. Preferably, the lifting unit 17 is fixed to a side wall 18 of the support 15 or to an adapter plate which is able to be applied to the side wall 15. Alternatively, the lifting unit 17 can also be arranged on a back wall 19 of the support 15.

A load receiving means 20 is arranged on the support 15. Alternatively to a fixed arrangement of the load receiving means 20 on the support 15, a suspension device can be provided on the support 15, such that different load receiving means 20 are able to be applied thereto. This load receiving means 20 comprises two fork arms 27, 28 which are at a distance to one another. These fork arms 27, 28 are preferably formed as rollers or castors which are mounted in their position to be rotated around the individual axle. Thus, a wheel applied thereto—as is stated below—can be supported on the load receiving means 20 and can be rotated around its own axle.

In the exemplary embodiment, the load receiving means 20 comprises a first fork arm 27 which is arranged to be stationary with regard to the support 15 and a second fork arm 28 which is able to be driven relative to the first fork arm 27. Thus, a spacing d can be able to be adjusted. The change of the spacing d can occur by a manual drive or by an electric or hydraulic drive. Alternatively, both the first and the second fork arm 27, 28 can be arranged on a lateral yoke of the load receiving means 20, with each being able to be driven relative to the other.

A load receiving region 21 is formed by the load receiving means 20. In particular, this load receiving region 21 is determined by the length of the first and second fork arm 27, 28 and the spacing d thereof. Thus, a rectangular or square load receiving region 21 is formed. A longitudinal side B of the load receiving region 21 points towards the load receiving means 20 or limits the load receiving region 21 to the load receiving means 20. The load, such as, for example, the wheel or the wheels, can be received within this region. This load receiving region 21 preferably lies within a base surface which is formed by the base frame 12. The base frame 12 preferably has two arms 23, 24 which are aligned in parallel to one another, which are fixed and positioned at a distance to one another by a further arm 25, 26. Thus a U-shaped base frame 12 is formed, wherein the load receiving region 21 lies within the U-shaped base frame 12.

The load receiving means 20 can also be formed as a platform, or receive a platform using the fork arms 27, 28, in order to form a type of lifting table having a work platform. Furthermore, a load arm can be arranged on the upper end of the support 15 in order to be able to make use of a crane function to lift and lower a load within the load receiving region 21.

According to the embodiment depicted in FIG. 2, the base frame comprises, as well as the first and second arms 23, 24 which are aligned in parallel, a third arm 25 and a fourth arm 26, wherein the third arm 25 is formed to be shorter than the fourth arm 26. These two are arranged at an obtuse angle to each other. Due to the unequal lengths of the third and fourth arms 25, 26 as well as the arrangement at an obtuse angle, a transfer region 55 (FIG. 3) between the third and fourth arm 25, 26 is shifted eccentrically to the base frame 12.

The chassis arranged on the base frame 12 comprises rollers 52 which are arranged on the front free end of the first and second arm 23, 24, as well as a steerable roller 53, which is arranged on a drawbar 54 that is only partially depicted. This drawbar 54 is connected to the base frame 12 and preferably engages with the third arm 25. Thus, the drawbar 54 is allocated to the lifting column 14, such that the asymmetrical construction enables good accessibility to the central region of the load receiving region 21. In this embodiment, the base frame 12 is supported substantially on the floor by lowering the steerable rollers and is secured against driving without the rollers 52 being retracted. Alternatively, all rollers can be retracted equally with respect to the base frame, such that this is completely supported on the floor for a subsequent load reception. Alternatively, a steering chassis can also be arranged on the base frame 12.

In FIG. 3a, which shows a view onto the base frame 12 and a sectional view through the lifting column 14 and the support 15, the eccentric arrangement of the lifting column 14 on the base frame 12 emerges. In a first embodiment of the lifting column 14, this is preferably formed to be rectangular or square in cross-section and attached to the shorter—so the third—arm 25, wherein a side wall surface 57 of the third arm 25, pointing towards the load receiving region 21, is arranged for alignment with a first guide element 47 of the lifting column 14 that is formed, for example, as a guide surface, for the driveable arrangement of the support 15 in parallel to the side wall surface 57 on the third arm 55, or even in a plane. The cross-sectional surface of the lifting column 14 preferably corresponds approximately or identically to the cross-sectional surface of the third arm 25, such that this undergoes a complete support on the third arm 25. Due to this arrangement and alignment of the lifting column 14 relative to the third arm 25, a resulting force F acting on the lifting column 14 and the support 15 under application of a load, points towards the load receiving region 21. Thus a high level of force absorption can be achieved, whereby, despite an asymmetrical arrangement of the lifting column with respect to the base frame, this lifting device 11 can be used as a single-column lifting device.

A further guide element 46 engages with the first guide element 47 of the lifting column 14, on which the support 15 formed as a sleeve is in turn supported during load reception. The guide element 46 is preferably formed as a slide or tread surface. Alternatively, as well as a slide bearing, a roller or castor bearing can also be used. The first and further guide elements 47, 46 form a guide 45, using which the support 15 is guided to move back and forth relative to the lifting column 14. In view of the geometric embodiments of the lifting column 14 and of the support 15 as well as of the guide elements 46, 47, the alternative embodiments are referenced in full scope, which are described and depicted in WO2010/112200 A1. This means that the first guide element 47 can consist, for example, of two guide sections arranged at an obtuse angle to each other, which together result in the guide element 46. Furthermore, the guide 45 can alternatively be formed by two U-shaped rails pointing towards one another, which are part of the lifting column, in which slide elements or roller bodies are guided as a further guide element 46, which are arranged on the support 15.

The lifting column 14 can, according to an alternative embodiment which is not depicted in more detail, also be arranged on the fourth arm 26 in an eccentric position with regard to the base frame 12.

A further alternative embodiment of the base frame 12 that is not depicted in more detail comprises three further arms between the two first and second arms 23, 24 that are aligned in parallel, wherein a respective arm arranged on the arm 23, 24 is arranged to be pointing towards the centre of the base frame at an angle of, for example, 45° and the fifth arm connects the two inclined—so the third and fourth—arms to each other. In this embodiment, the lifting column can likewise be arranged eccentrically to one or both inclined arms—so the third and fourth arms, wherein an arm is provided in the central region of the base frame, which is aligned at a right angle to the first and second arms. Thus, for example, a drawbar can be arranged on the central arm, just as on the inclined arm.

Figures 3B, 3C:
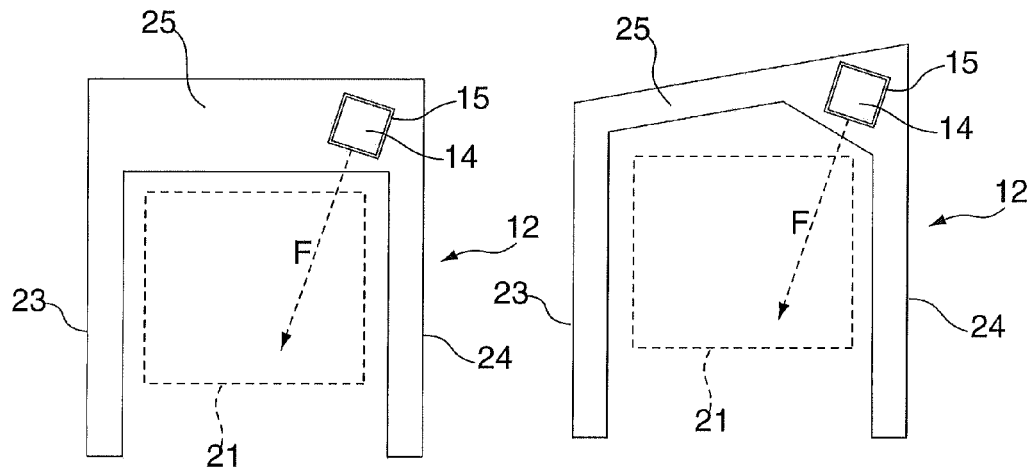

In FIG. 3b, an alternative embodiment to the embodiments of the base frame 12 described above is depicted. In this embodiment, the base frame 12 has a U-shape which is formed by two parallel arms 23, 24 and a third arm 25, which is arranged at a right angle to each arm 23, 24. The lifting column 14 is eccentrical to the base frame 12 and in turn rotated in such a way arranged with alignment on the third arm 25, that the resulting force lies within the load receiving region 21.

In FIG. 3c, a variation of FIG. 3b is depicted. The two parallel arms 23, 24 are in turn connected to each other by a third arm 25, wherein this third arm 25 is arranged at an obtuse angle to the left arm 23 and at an acute angle to the right arm 24. Thus the two arms 23, 24 are formed to be of different length. In a corner region—for example between the second arm 24 and the third arm 25—a lifting column 14 is in turn aligned in such a way that the resulting force points into the load receiving region 21. The lifting column 14 can, as is depicted in FIG. 3c, be arranged on a platform formed in the corner region of the second and third arm 24, 25. Likewise, the lifting column 14 can be supported exclusively on the arms 23, 24.

In the embodiments described above, it is fundamentally also possible for the lifting column 14 to be allocated to the arm 23 instead of the arm 24. Additionally, deviating from the depicted parallel arms 23, 24 it can also be provided that these widen towards the free ends thereof, i.e. that the rollers arranged on the free ends of the arms 23, 24 have a greater spacing than the ends of the arms 23, 24 in the rear region, in which the arms 23, 24 are connected to the third arm 25 or to the third and fourth arms 25, 26.

Figures 3D, 3E:
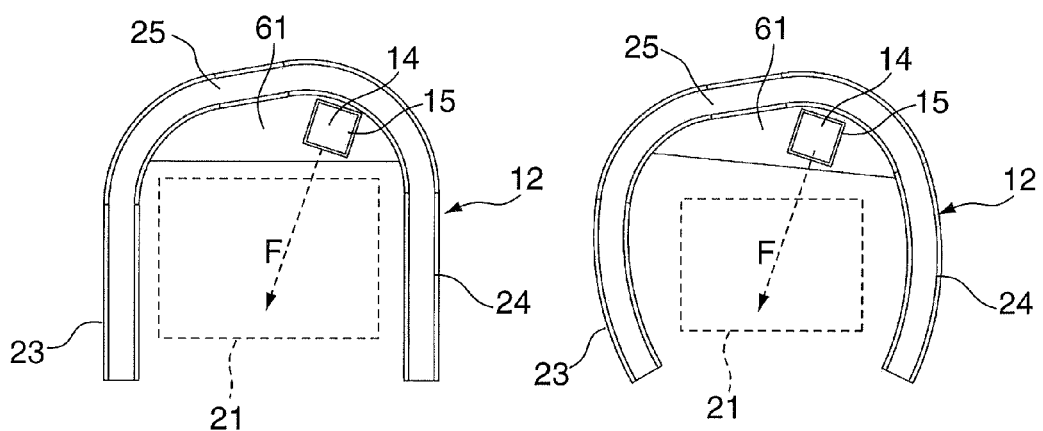

In FIG. 3d, a further alternative embodiment of the base frame 12 is depicted in a view from above. Here, the third arm 25 is formed to be curved and can have the contour of an asymmetrical arc. Within the arc, an arc-segment-type receiver 61 can be provided to position the lifting column 14. Alternatively, the lifting column 14 can also be arranged on the third arm 25. The asymmetrical, arc-shaped contour of the third arm 25 serves to arrange the lifting column 14 eccentrically and twisted in the alignment to the base frame 12, such that, in turn, the resulting force lies in the load receiving region 21.

For this embodiment the alternatives described above also apply with regard to the parallel arms 23, 24 and the positioning of the lifting column 14.

In FIG. 3e, a further alternative embodiment to FIG. 3d is depicted. The arms 23, 24 are each formed to be curved, such that the base frame 12 has a type of horseshoe shape. Here, in turn, an asymmetrical arc contour of the third arm 25 is selected in order to receive the lifting column 14, preferably on the receiver 61, for example in this region.

FIG. 4 shows a front view of the lifting device 11 having a tyre 29 received by the load receiving means 20. Due to the gripper arms 27, 28 formed as a rotatably-mounted castor, it is not only enabled that a wheel 29 located in the wheel gripping element is able to rotate in order to bring, for example, the hole pattern of a wheel hub of the vehicle into congruency with any of the wheel rims of the wheel 29, but rather a precise adjustment in the location of the tyre 29 is enabled when changing the spacing of the fork arms 27, 28. By changing the spacing D of the fork arms 27, 28—so by enlarging or reducing the spacing D—the axle centre point of the tyre 29 can be shifted to the left or right of the vertical. Additionally, the load bearing means 20 can be moved back and forth. Thus a precise positioning of the hole pattern of the wheel rim of the wheel 29 transversely to the lifting device is enabled in order to enable a congruent positioning of the hole pattern of the wheel rim of the wheel 29 to the hole pattern of the wheel hub without additional driving of the lifting device 11.

A wheel retaining device 48 is provided to fix a standing position of the wheel 29 on the load receiving means 20, which encloses the tyre with the gripper section 49 thereof (FIG. 1). This gripper section 49 is arranged to swivel around an axis, such that the U-shaped gripper section 49 of the wheel retaining device 48 is able to be released from the wheel 29 by a rotational movement.

In FIG. 5, an alternative embodiment to the lifting device 11 according to FIG. 1 is depicted. This embodiment deviates to the effect that the support 15 is mounted within the lifting column 14 and is formed as a closed tube. Here, a central recess 30 is provided in an upper front side of the lifting column 14, through which the support 15 can pass during its lifting movement. According to the profile of the support 15 or the cross-sectional geometry thereof, the central recess 30 is formed to be substantially square or rectangular. The guide elements are preferably formed as two rollers 31 which lie in a mutual axis. This embodiment has the advantage of an automatic centering of the support 15 with respect to the lifting column 14. With regard to the constructive embodiment of the lifting device 11 with regard to the lifting column 14 and the support 15, WO 2010/112200 is referred to in its full scope as well as the embodiments described therein, which can also be used above.

FIGS. 6 to 8 show the use of the lifting device 11 according to the invention as a single-column lifting platform, which together form a lifting device or a lifting system. This lifting device 11 serves, on the one hand, to lift the vehicle 39, as is depicted in FIG. 6, in order to undertake maintenance and installation work thereon. Here, lifting devices 11 for a lifting mechanism or a lifting system can be provided according to the number of axles of the vehicle and can be configured to a lifting system, wherein at least four lifting devices 11 are preferably provided to lift a vehicle 39, such that two lifting devices 11 allocated in each pair engage an axle. The configuration and the integration of the individual lifting devices 11 into the lifting mechanism occur via the control of the lifting mechanism or a lifting device 11. At the same time, the lifting and lowering of the individual lifting devices is controlled and monitored via a mutual control or a master-slave control. On the other hand, the single-column lifting devices of this lifting mechanism can also be used at the same time for wheel installation or for wheel replacement.

The implementation of an uninstallation of a wheel as well as an installation of a wheel with the lifting devices 11 according to the invention is, for example, described by a vehicle 39 standing on a road surface. In a first step, four such lifting devices 11, 32, 33, 34 are preferably positioned on the vehicle wheels 29, 35, 36, 37 by means of their driveable base frame 12, such that each wheel 29 rests on the corresponding load receiving means 20 of the lifting device 11, 32, 33, 34 that is allocated to each of them. The lifting devices 11 are each allocated in pairs to an axle. For a multi-axle vehicle 39, two lifting devices 11 can be provided on each axle. Likewise, individual axles can also be freely suspended, wherein at least two pairs of lifting devices 11 are provided on two axles for lifting a vehicle.

In a second step, all lifting devices 11 are controlled at the same time and are lifted continuously to a working height, wherein the entire vehicle 39 is lifted via the axles connecting the wheels 29 in pairs. Here, the lifting movement is controlled and monitored by a preferably wireless communication of the control units of the lifting devices 11 between one another. FIG. 6 shows the vehicle 39 lifted to working height having the lifting devices 11, 32, 33, 34 bearing the vehicle 39.

In a third step, the axle of the wheel 29 to be replaced is set on a suitably positioned support device 40 close to its end facing towards the wheel 29, in order to support and stabilise the vehicle 39 in this position. Alternatively, the support device 40 can also engage with an obvious load receiving point of the body.

In a fourth step, the wheel 29 is released from the wheel hub of the axle, wherein, for example, an impact wrench can be used to remove the wheel nuts. During this step, the wheel 29 furthermore rests stably on the load receiving means 20.

Due to the asymmetrical arrangement of the lifting column 14 or the eccentric arrangement of the lifting column 14 with regard to the base body 12, an unhindered and good accessibility to the wheel nuts of the wheel 29 is enabled.

Before the last wheel nut is removed from the wheel hub, the wheel retaining device 48 is positioned on the wheel 29. Alternatively, this can also occur only after the removal of all wheel nuts, yet before a lowering movement of the load receiving means 20.

In a fifth step, the wheel 29 is lowered by means of the lifting device 11 in order to enable a removal of the wheel 29 in the sixth step. A new wheel 41 is positioned on the lifting device 11 according to the seventh step. FIG. 7 shows the overall arrangement in this work phase.

In an eighth step, in the case of a wheel replacement, a new wheel 41 is lifted to axle height by means of the lifting device 11. In the case that the wheel 29 was only uninstalled in order to undertake maintenance and/or repair work to the wheel hub, the brake system or similar, the same wheel 29 can be lifted again to axle height by means of the lifting device. In an optional ninth and tenth step, the wheel 29 resting on the load receiving means 20 is precisely positioned by rotation of the same and possibly a change of spacing of the fork arm(s) 27, 28, such that the hole pattern of the wheel rim corresponds and aligns to the hole pattern of the wheel hub. FIG. 8 shows this work step.

In an eleventh step, the wheel 29 is fixed to the axle 42 by means of wheel nuts.

In a twelfth step, at least the wheel 29 that is now fixed to the axle 42 is at least slightly lifted again by means of the lifting device 11 in order to remove the support device 40 located thereunder in a thirteenth step. Alternatively, the lifting devices 11 allocated in pairs to the axle 42 are lifted slightly together, or even all of the lifting devices 11 forming the lifting mechanism are lifted at the same time in order to remove the support device 40.

In a fourteenth step, the vehicle 39 is lowered such that all lifting devices 11, 32, 33, 34 can finally be removed in a fifteenth step and the vehicle 39 can rest again on the ground, ready for operation.

Provided that the vehicle 39 is lifted by a further lifting platform or a lifting system and an uninstallation of the wheel 29 is required, the lifting device 11 is positioned with regard to the corresponding wheel 29, such that the load receiving means 20 reaches under the wheel 29. Subsequently, the wheel nuts are removed, such that the wheel 29 can be removed and can be lowered by means of the lifting device 11. Then, in turn, the installation of the wheel 29 can occur on the wheel hub, analogously to the eighth to the eleventh step described above. This sequence of work steps can then take place if the uninstalled wheel is installed again or the uninstalled wheel is replaced by a new wheel.

Furthermore, the lifting device 11 can be used as wheel installation for an initial equipping, in that, for example, the vehicle 39 is prepared on a conveyor belt or on a platform and the wheel 29 is to be installed on the wheel hub. In such a case, the respective wheel 39 is positioned on the load receiving means 20 and is possibly fixed to the wheel retaining device 48. Subsequently, the steps eight to eleven described above are implemented.

The invention claimed is:

1. A lifting device for lifting loads, vehicles or similar, comprising:
   a mobile base frame,
   a lifting column provided on the base frame,
   a support, wherein the support is guided on the lifting column by a guide, and a load receiver arranged on the support, with which a load receiving region is determined, wherein the base frame has at least one first arm having a first support point and at least one second arm having a second support point, wherein the first arm and the second arm are aligned substantially in parallel and are connected to at least one further arm in a substantially U-shaped manner to form a substantially U-shaped connection, wherein the base frame has at least three support points outside the load receiving region of the load receiver, and a drive unit that is able to be controlled by a control and which moves the support back and forth relative to the lifting column, wherein the lifting column is arranged eccentrically with respect to the load receiving region on the base frame and is arranged in a rotated position with respect to a longitudinal side of the load receiving region, and wherein the at least one further arm of the substantially U-shaped connection includes at least two arms of unequal length which are arranged at an obtuse angle to each other, wherein the at least two arms include a third arm and a fourth arm that is longer than the third arm, and the lifting column is arranged on the third arm.

2. The lifting device according to claim 1, wherein the lifting column is arranged adjacently to the fourth arm.

3. The lifting device according to claim 1, wherein the load receiver is formed as a wheel gripping element having a first fork arm and a second fork arm, which are aligned in parallel to the first arm and the second arm of the base frame.

4. The lifting device according to claim 1, wherein the load receiver has receiving elements which are mounted on rollers at least in sections or are able to slide on at least one fork arm.

5. The lifting device according to claim 3, wherein at least one of the two fork arms is formed as a rotatably mounted roller or drum.

6. The lifting device according to claim 3, wherein at least one of the fork arms is arranged adjustably at a distance to the other fork arm.

7. The lifting device according to claim 1, wherein a wheel retaining device is provided on the lifting column, the support or the base frame.

8. The lifting device according to claim 7, wherein the wheel retaining device has a U-shaped gripping section.

9. The lifting device according to claim 1, wherein at least one steerable roller or a steering chassis is allocated to the load receiving region opposite the lifting column and the support.

10. The lifting device according to claim 1, wherein the third arm and the fourth arm are arranged at an obtuse angle to the first arm and the second arm.

11. A method for installing and uninstalling replacements of a wheel on an axle of a vehicle, comprising the following steps for a vehicle located on the ground:
a) setting of at least two lifting devices which are allocated to each other according to claim 1 on the wheel of an axle,
b) lifting of the at least one axle of the vehicle by the lifting devices,
c) at least partial depositing of the vehicle or the axle of the vehicle on at least on support device,
d) release of the wheel from a wheel hub of the axle,
e) lowering of the wheel by the lifting device,
f) removal of the wheel from the lifting device,
g) receiving of the same or a further wheel by the lifting device,
h) lifting of the wheel to the height of the axle by the lifting device,
i) fixing of a wheel rim of the wheel to the wheel hub of the axle,
j) further lifting at least of the mounted wheel together with the axle by the lifting device,
k) removal of the support device,
l) lowering of the vehicle to ground height and
m) removal of the lifting devices,
or comprising the following steps for a vehicle lifted by a further lifting device, which engages with a body of the vehicle:
n) setting of the lifting device according to claim 1 on the wheel,
o) implementation of the above steps d) to i)
p) removal of the lifting device.

12. The method according to claim 11, comprising a precise adjustment of the wheel for the alignment of a hole pattern of the wheel rim to the hole pattern of the wheel hub by at least one of the following intermediate steps, before fixing the wheel to the axle:
a) rotation of the wheel, which is arranged standing on the load receiving means and/or
b) displacement of the at least one fork arm of the load receiving means relative to the further fork arm.

13. The lifting device according to claim 1, wherein the lifting device is a wheel mounting trolley.

* * * * *